US009601067B2

(12) United States Patent
Huang et al.

(10) Patent No.: US 9,601,067 B2
(45) Date of Patent: *Mar. 21, 2017

(54) IN-CELL MULTI-TOUCH DISPLAY PANEL SYSTEM

(71) Applicant: ORISE TECHNOLOGY CO., LTD., Hsinchu (TW)

(72) Inventors: Chien-Ying Huang, Hsinchu (TW); Yen-Lin Huang, Taipei (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 304 days.

This patent is subject to a terminal disclaimer.

(21) Appl. No.: 13/861,409

(22) Filed: Apr. 12, 2013

(65) Prior Publication Data

US 2013/0285952 A1 Oct. 31, 2013

(30) Foreign Application Priority Data

Apr. 27, 2012 (TW) .............................. 101115159 A

(51) Int. Cl.
| | |
|---|---|
| G06F 3/044 | (2006.01) |
| G06F 3/047 | (2006.01) |
| G09G 3/36 | (2006.01) |
| G06F 3/041 | (2006.01) |

(52) U.S. Cl.
CPC ........... *G09G 3/3611* (2013.01); *G06F 3/044* (2013.01); *G06F 3/0412* (2013.01); *G06F 3/0416* (2013.01); *G06F 3/047* (2013.01); *G06F 2203/04103* (2013.01); *G06F 2203/04104* (2013.01)

(58) Field of Classification Search
CPC ........ G06F 3/0412; G06F 3/044; G06F 3/047; G06F 2203/04104
See application file for complete search history.

(56) References Cited

U.S. PATENT DOCUMENTS

| | | | | |
|---|---|---|---|---|
| 2005/0275616 | A1* | 12/2005 | Park ...................... | G06F 3/0412 345/102 |
| 2006/0017710 | A1* | 1/2006 | Lee ...................... | G02F 1/13338 345/173 |
| 2006/0109222 | A1* | 5/2006 | Lee ...................... | G02F 1/13338 345/88 |

(Continued)

*Primary Examiner* — Michael J Eurice
(74) *Attorney, Agent, or Firm* — Bacon & Thomas, PLLC

(57) ABSTRACT

An in-cell multi-touch display panel system includes a touch LCD panel and a touch display control subsystem. The touch LCD panel has a TFT layer, a conductive electrode layer, and a common-voltage and touch-driving layer. The TFT layer has K gate driving lines and L source driving lines for a display operation. The conductive electrode layer has M first conduct lines for a touch detection operation by sampling a touch detection result from the M first conduct lines. The common-voltage and touch-driving layer has N second conduct lines for receiving a common voltage signal in display and receiving a touch-driving signal in touch detection. The K gate driving lines are divided into N groups respectively corresponding to the N second conduct line. When one group of gate driving lines has the display driving signal, the corresponding second conduct line is connected to the common voltage signal.

16 Claims, 16 Drawing Sheets

(56) References Cited

U.S. PATENT DOCUMENTS

| | | | |
|---|---|---|---|
| 2007/0091013 A1* | 4/2007 | Pak | G02F 1/13338 345/50 |
| 2007/0176868 A1* | 8/2007 | Lee | G02F 1/13306 345/87 |
| 2008/0062140 A1* | 3/2008 | Hotelling | G09G 3/3648 345/173 |
| 2008/0186417 A1* | 8/2008 | Jung | G02F 1/13338 349/12 |
| 2009/0002336 A1* | 1/2009 | Choi | G06F 3/044 345/174 |
| 2009/0135158 A1* | 5/2009 | Takahashi | G06F 3/044 345/174 |
| 2010/0045635 A1* | 2/2010 | Soo | G06F 3/046 345/178 |
| 2010/0149128 A1* | 6/2010 | No | G02F 1/13338 345/174 |
| 2010/0194679 A1* | 8/2010 | Wu | G06K 9/00375 345/156 |
| 2010/0194707 A1* | 8/2010 | Hotelling | G06F 3/0412 345/173 |
| 2010/0253638 A1* | 10/2010 | Yousefpor | G06F 3/0416 345/173 |
| 2010/0289765 A1* | 11/2010 | Noguchi | G02F 1/13338 345/173 |
| 2010/0302202 A1* | 12/2010 | Takeuchi | G06F 3/0418 345/174 |
| 2011/0128254 A1* | 6/2011 | Teranishi | G06F 3/0412 345/174 |
| 2011/0210927 A1* | 9/2011 | Mizuhashi | G06F 3/044 345/173 |
| 2012/0050217 A1 | 3/2012 | Noguchi et al. | |
| 2012/0081320 A1* | 4/2012 | Hwang | G06F 3/0418 345/173 |
| 2012/0162133 A1* | 6/2012 | Chen | G06F 3/0418 345/174 |
| 2012/0218199 A1* | 8/2012 | Kim | G06F 3/0412 345/173 |
| 2012/0218482 A1* | 8/2012 | Hwang | G06F 3/044 349/12 |

* cited by examiner

IN-CELL MULTI-TOUCH DISPLAY PANEL SYSTEM

BACKGROUND OF THE INVENTION

1. Field of the Invention

The present invention relates to the technical field of touch panels and, more particularly, to an in-cell multi-touch display panel system.

2. Description of Related Art

The principle of touch panels is based on different sensing manners to detect a voltage, current, acoustic wave, or infrared to thereby detect the coordinate of a touch point on a screen as touched by a finger or other objects. For example, a resistive touch panel uses a voltage difference between the upper and lower electrodes to compute the position of a pressed point for detecting the location of the touch point, and a capacitive touch panel uses a capacitance change generated in an electrostatic combination of the arranged transparent electrodes with the touching part of a human body to generate a current or voltage for detecting the coordinate of the touching part.

Upon the principle, the capacitive touch technologies can be divided into a surface capacitive touch sensing and a projected capacitive touch sensing. The surface capacitive touch sensing has a simple configuration, but the multi-touch implementation is not easy, and the problems of electromagnetic disturbance (EMI) and noises are difficult to be overcome. Therefore, the popular trend of capacitive touch development is toward the projected capacitive touch sensing.

The projected capacitive touch sensing can be divided into a self capacitance and a mutual capacitance sensing. The self capacitance sensing indicates that a capacitance coupling is generated between a touch object and a conduct line, and a touch occurrence is decided by measuring a capacitance change of the conduct line. By contrast, the mutual capacitance sensing indicates that a capacitance coupling is generated between two adjacent conduct lines when a touch occurs.

A typical self capacitance sensing senses the grounded capacitance (Cs) on every conduct line. Thus, a change of the grounded capacitance is used to determine whether an object is approached to the capacitive touch panel. The self capacitance or the grounded capacitance is not a physical capacitor, but parasitic and stray capacitance on every conduct line. FIG. 1 is a schematic view of a typical self capacitance sensing. As shown in FIG. 1, at the first time interval, the driving and sensing units 110 in a first direction drive the conduct lines in the first direction to charge the self capacitance (Cs) of the conduct lines in the first direction. At the second period, the driving and sensing units 110 sense the voltages on the conduct lines in the first direction to obtain m data. At the third period, the driver and sensors 120 in a second direction drive the conduct lines in the second direction to charge the self capacitance of the conduct lines in the second direction. At the fourth period, the driving and sensing units 120 sense the voltages on the conduct lines in the second direction to obtain n data. Therefore, there are m+n data obtained in total.

The typical self capacitance sensing of FIG. 1 connects both a driving circuit and a sensing circuit on the same conduct line in order to drive the conduct line and sense a signal change on the same conduct line to thereby decide a magnitude of the self capacitance. In this case, the advantages include:

(1) reduced amount of data since the typical touch panel has m+n data in a single image only, so as to save the hardware cost;

(2) reduced time required for sensing a touch point since an image raw data can be quickly fetched due to only two sensing operations, i.e., concurrently (or one-by-one) sensing all the conduct lines in the first direction and then in the second direction, for completing a frame, as well as reduced time required for converting a sensed signal from analog into digital; and (3) lower power consumption due to the reduced amount of data to be processed.

However, such a self capacitance sensing also has the disadvantages as follows:

(1) When there is a floating conductor (such as a water drop, an oil stain, and the like) on the touch panel, it may causes an error decision on a touch point; and (2) When there are multiple touch points concurrently on the touch panel, it may cause a ghost point effect, resulting in that such a self capacitance sensing cannot be used in multi-touch applications.

In addition, another method of driving the typical capacitive touch panel is to sense a magnitude change of mutual capacitance Cm to thereby determine whether an object is approached to the touch panel. Likewise, the mutual capacitance Cm is not a physical capacitor but a mutual capacitance between the conduct lines in the first direction and in the second direction. FIG. 2 is a schematic diagram of a typical mutual capacitance sensing. As shown in FIG. 2, the drivers 210 are located on the first direction (Y), and the sensors 220 are located on the second direction (X). At the upper half of the first time interval T1, the drivers 210 drive the conduct lines 230 in the first direction and use the voltage Vy_1 to charge the mutual capacitance (Cm) 250, and at the lower half, all sensors 220 sense voltages (Vo_1, Vo_2, . . . , Vo_n) on the conduct lines 240 in the second direction to obtain n data. Accordingly, m*n data can be obtained after m driving periods.

Such a mutual capacitance (Cm) sensing has the advantages as follows:

(1) It is easily determined whether a touch is generated from a human body since a signal generated from a floating conductor is in a different direction than a grounded conductor; and (2) Every touch point is indicated by a real coordinate, and the real position of each point can be found when multiple points are concurrently touched, so that such a mutual capacitance (CO sensing can easily support the multi-touch applications.

A typical flat touch display is produced by stacking the touch panel directly over the flat display. Since the stacked transparent panel is transparent, the image can be displayed on the touch panel stacked over the flat display, and the touch panel can act as an input medium or interface.

However, such a way requires an increase of the weight of the touch panel due to the stack resulting in relatively increasing the weight of the flat display, which cannot meet with the requirement of compactness in current markets. Furthermore, when the touch panel and flat display are stacked directly, the increased thickness reduces the transmittance of rays and increases the reflectivity and haziness, resulting in greatly reducing the display quality of the screen.

To overcome this, the embedded touch control technology is adapted. The currently developed embedded touch control technologies are essentially on-cell and in-cell technologies. The on-cell technology uses a projected capacitive touch technology to form a sensor on the backside (i.e., a surface for attaching a polarized plate) of a color filter (CF) for being integrated into a color filter structure. The in-cell technology embeds sensors in an LCD cell to thereby integrate a touch element with a display panel such that the display panel itself is provided with a touch function without having to be attached or assembled to a touch panel. Such a technology typically is developed by a TFT LCD panel factory. The in-cell multi-touch panel technology is getting more and more mature, and since the touch function is directly integrated during a panel production process, without adding a layer of touch glass, the original thickness is maintained and the cost is reduced.

FIG. 3(A) is a schematic view of a configuration of a typical in-cell multi-touch panel 300. In FIG. 3(A), the panel 300 includes a lower polarizer 310, a lower glass substrate 320, a thin film transistor (TFT) or LTPS layer 330, a liquid crystal (LC) layer 340, a common voltage and touch driving layer 350, a color filter layer 360, an upper glass substrate 370, a conductive electrode layer 380, and an upper polarizer 390. As shown in FIG. 3(A), in order to save the cost, a touch sensor is integrated with an LCD panel, and the common voltage layer of the LCD panel is located at a layer as same as the drivers of the touch sensor, thereby forming the common voltage and touch driving layer 350, so as to achieve the cost saving. The conductive electrode layer 380 is located on the upper glass substrate 370. The TFT or LTPS layer 330 is constructed of thin film transistors (TFTs) or low-temperature poly-Si film transistors (LTPS) 332 and transparent electrodes 331.

FIG. 3(B) is a schematic view of another configuration of a typical in-cell multi-touch panel. As compared with FIG. 3(A), the difference in FIG. 3(B) is that the conductive electrode layer 380 is located beneath the upper glass substrate 370.

FIG. 3(C) is a schematic view of yet another configuration of a typical in-cell multi-touch panel. As compared with FIG. 3(A), the difference in FIG. 3(C) is that the common voltage and touch driving layer 350 is located beneath the LC layer 340.

FIG. 3(D) is a schematic view of a further configuration of a typical in-cell multi-touch panel. As compared with FIG. 3(C), the difference in FIG. 3(D) is that the conductive electrode layer 380 is located beneath the upper glass substrate 370.

The configuration of the in-cell multi-touch panel in any one of FIGS. 3(A), 3(B), 3(C) and 3(D) uses a time sharing to divide the time for one display frame into a display cycle and a touch cycle to thereby commonly use the common voltage layer of the display panel and the driving layer of the touch sensor. The timings for FIGS. 3(A), 3(B), 3(C) and 3(D) are shown in FIGS. 4(A), 4(B), 4(C) and 4(D), respectively.

As shown in FIG. 4(A), the time for one display frame is divided into one display cycle and one touch cycle, and the frame of the display panel is displayed in the display cycle before the touch sensing is performed in the touch cycle. As shown in FIG. 4(B), the touch sensing is performed before the frame of the display panel is displayed. As shown in FIG. 4(C), partial lines of one frame are displayed in a section A; then the touch sensing is performed; finally the remaining lines of the frame are displayed in a section B. As shown in FIG. 4(D), a display of the vertical synchronous signal (Vsync) is changed such that the frame of the display panel is displayed when the vertical synchronous signal (Vsync) is at a high level. Conversely, when the vertical synchronous signal (Vsync) is at a low level, the touch sensing is performed.

In US Patent Publication 2012/0050217 entitled "Display device with touch detection function, control circuit, driving method of display device with touch detection function, and electronic unit", the timing of the first embodiment (shown in FIG. 8 of the patent publication) is as same as that in FIG. 4(A), in which the frame is displayed before the touch sensing is performed. The timing of the second embodiment (shown in FIG. 17 of the patent publication) is as same as that in FIG. 4(C), in which the partial lines of the frame is displayed in the section A; then the touch sensing is performed; finally the remaining lines of the frame is displayed in the section B. The timing of the third embodiment (shown in FIG. 19 of the patent publication) is similar to the first embodiment, i.e., as same mode as in FIG. 4(A) except that a toggle of the common voltage layer is used as a trigger for the touch sensing. The first and third embodiments use the time sharing to perform the touch sensing on every line to be displayed, and the second embodiment uses the time sharing to perform the touch sensing on every frame to be displayed. However, either the first embodiment, the third embodiment, or the second embodiment may sacrifice the settling time for the display data and the touch data.

For such a time sharing, as the resolution of the display panel is getting higher, the number of pixels to be driven by the display driver IC is getting more, and thus the time required becomes longer In this case, the display frame rate has to be maintained at 60 Hz or above, i.e., each frame only contains 16.6 ms. However, it is increasingly difficult to perform the image displaying and touch sensing in 16.6 ms due to the higher and higher resolution of the display panel. Therefore, the increasing image resolution is limited.

Accordingly, it is desirable to provide an improved in-cell multi-touch display panel system to mitigate and/or obviate the aforementioned problems.

SUMMARY OF THE INVENTION

The object of the present invention is to provide an in-cell multi-touch display panel system, which can overcome the prior problem of limiting the increased resolution of a display panel and commonly use the same transparent conductive layer in driving of the common voltage layer and touch sensors of an LCD panel, thereby saving the cost.

To achieve the object, there is provided an in-cell multi-touch display panel system, which comprises a touch LCD panel and a touch display control subsystem. The touch LCD panel includes a thin film transistor (TFT) layer, a conductive electrode layer, and a common-voltage and touch-driving layer. The TFT layer has K gate driving lines and L source driving lines to drive corresponding transistor and capacitor based on a display pixel signal and a display driving signal in display, where K, L are each a positive integer. The conductive electrode layer has M first conduct lines to detect an approached external object based on a touch driving signal, where M is a positive integer. The common-voltage and touch-driving layer has N second conduct lines for receiving a common voltage signal in display and receiving a touch-driving signal in touch detection, where N is a positive integer and K>N. The touch display control subsystem provides the touch driving signal to the N second conduct lines and samples touch voltages from the M first conduct lines to thereby detect the approached external object. The K gate driving lines are divided into N groups each corresponding to one of the N second conduct lines. When one group of gate driving lines has the display driving signal, the corresponding second conduct line is connected to the common voltage signal (Vcom).

Other objects, advantages, and novel features of the invention will become more apparent from the following detailed description when taken in conjunction with the accompanying drawings.

DETAILED DESCRIPTION OF THE PREFERRED EMBODIMENT

Figure 1:
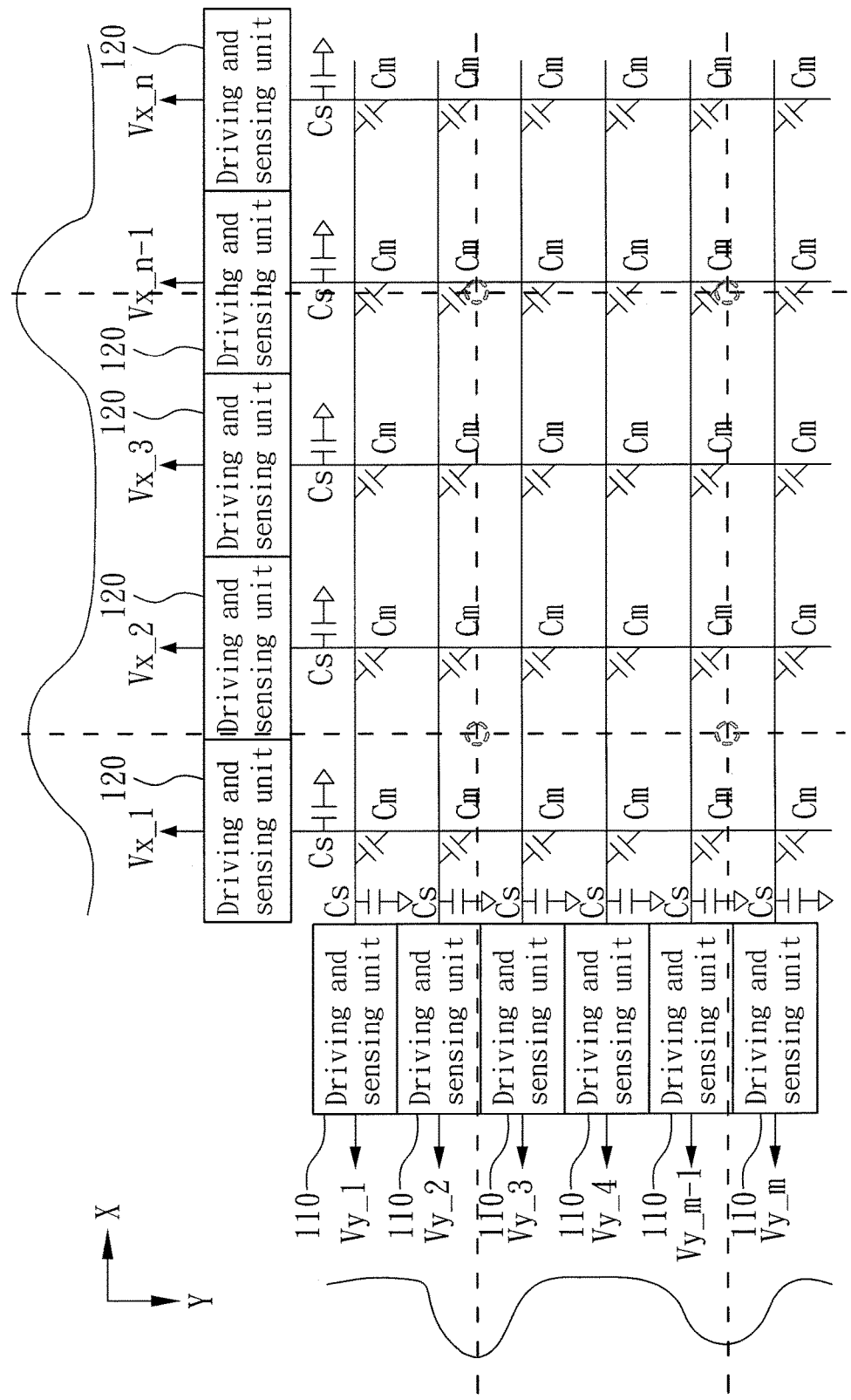
FIG. 1 is a schematic diagram of a typical self capacitance sensing.
Figure 2:
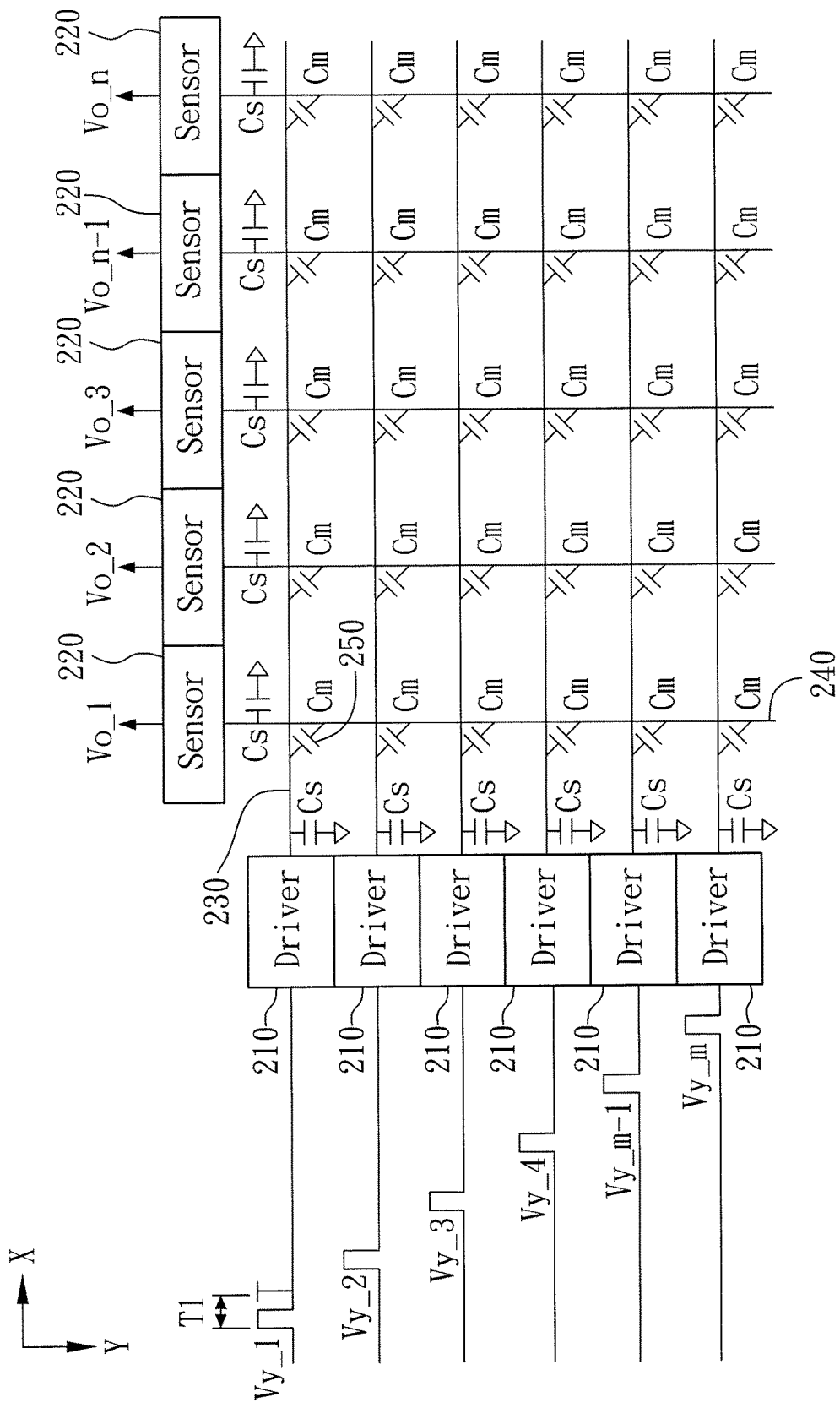
FIG. 2 is a schematic diagram of a typical mutual capacitance sensing.
Figure 3A:
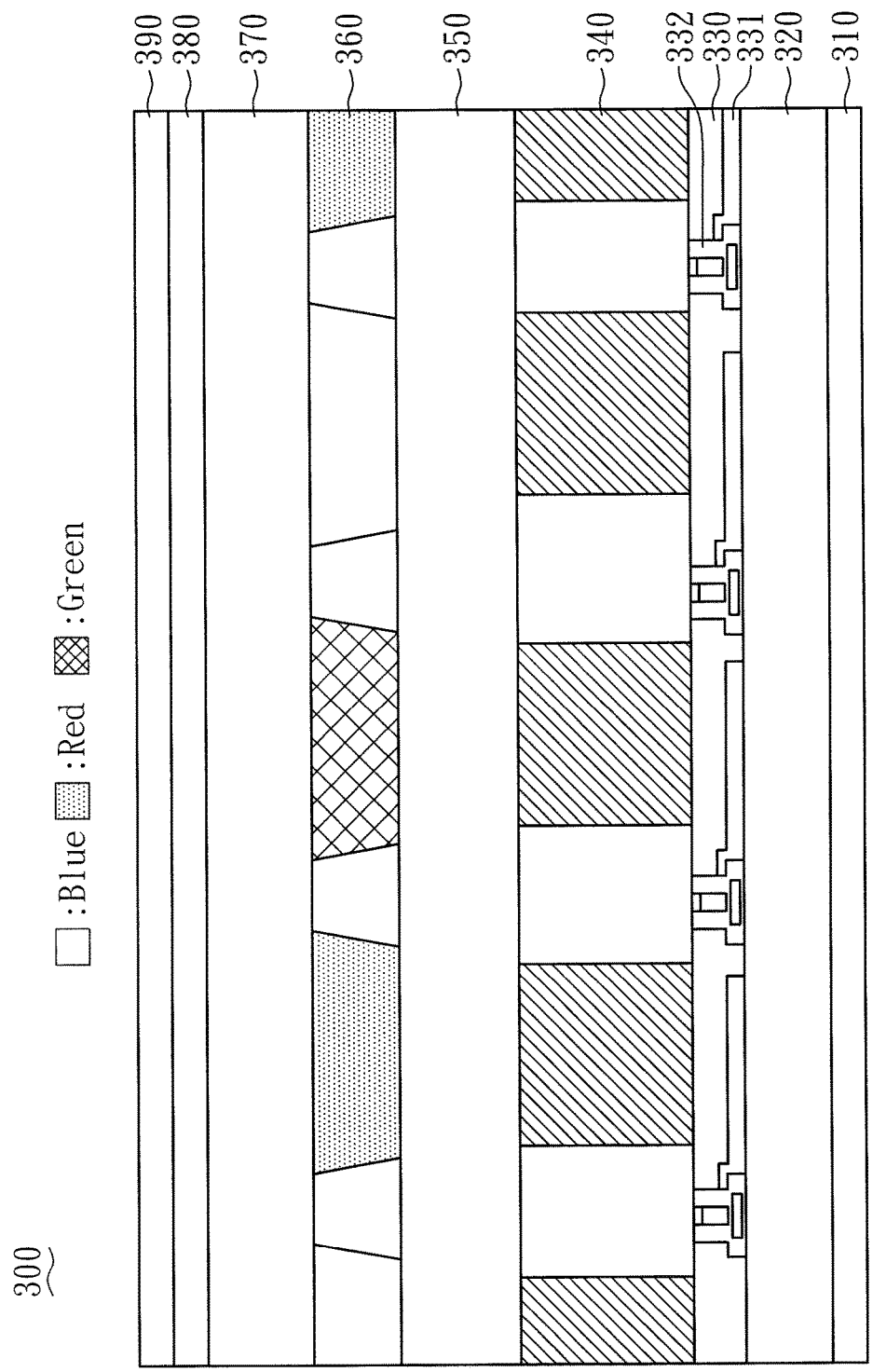
FIGS. 3(A)-3(D) show the configuration of a typical in-cell multi-touch panel.
Figure 3B:
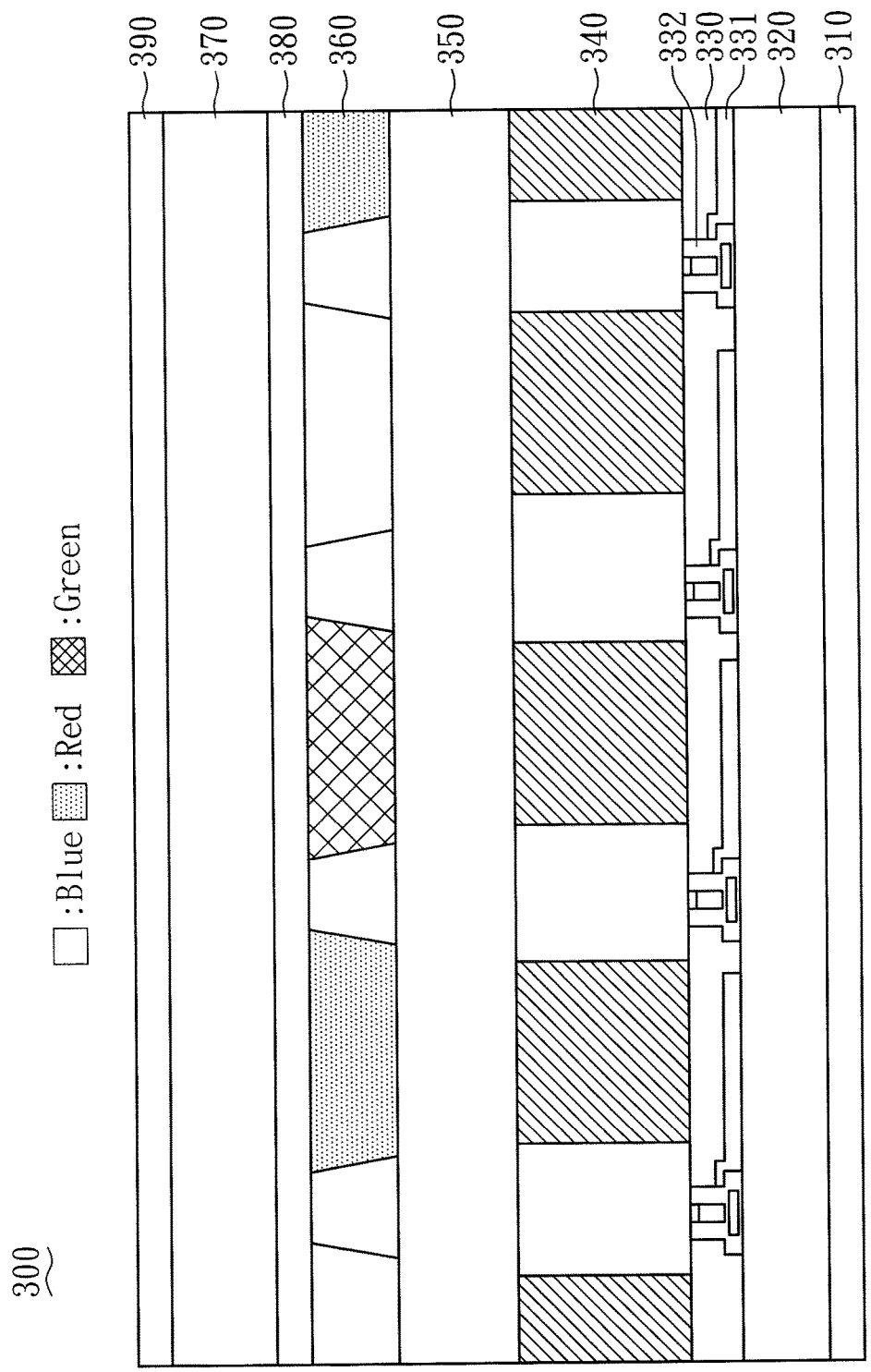
Figure 3C:
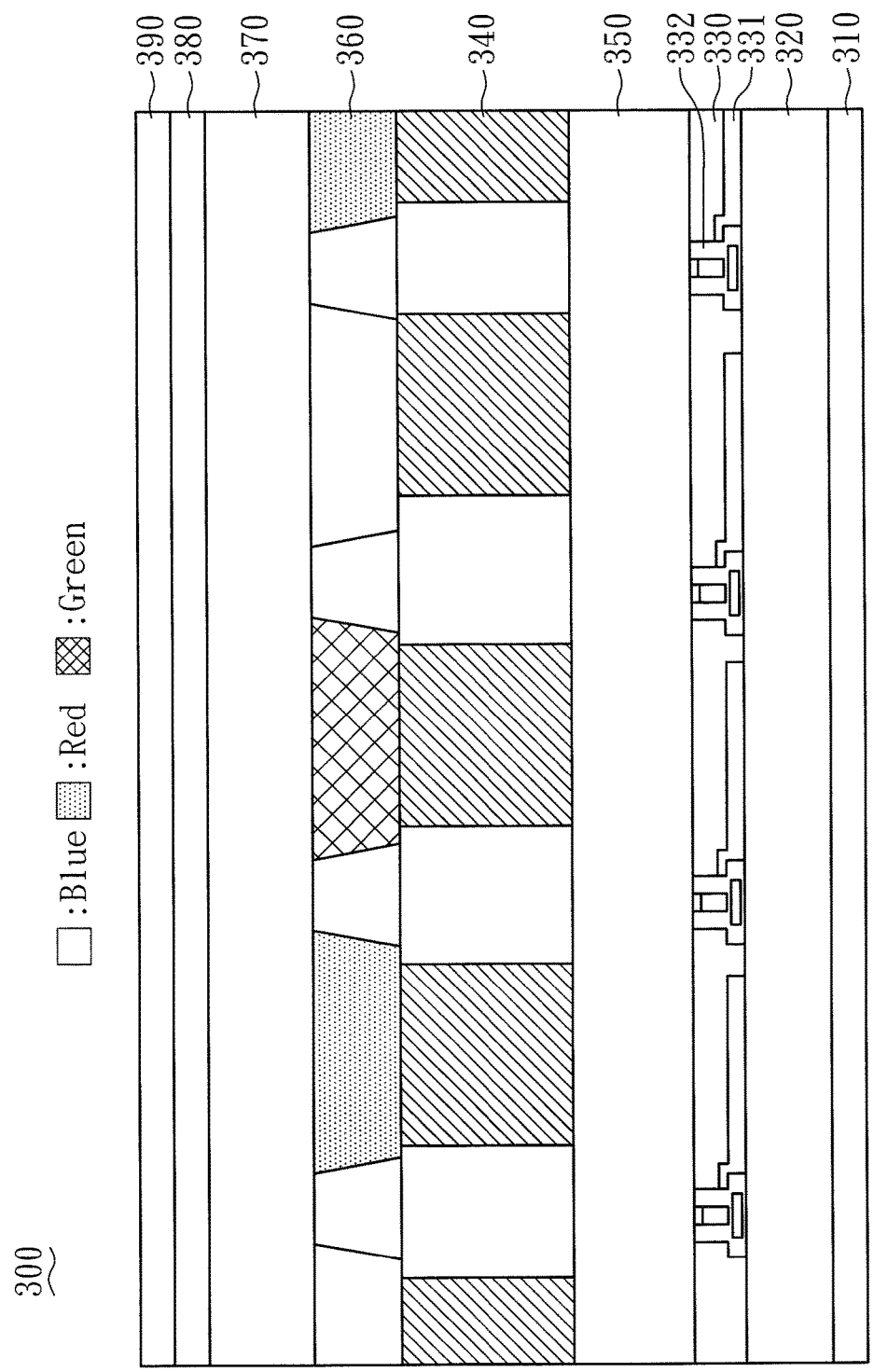
Figure 3D:
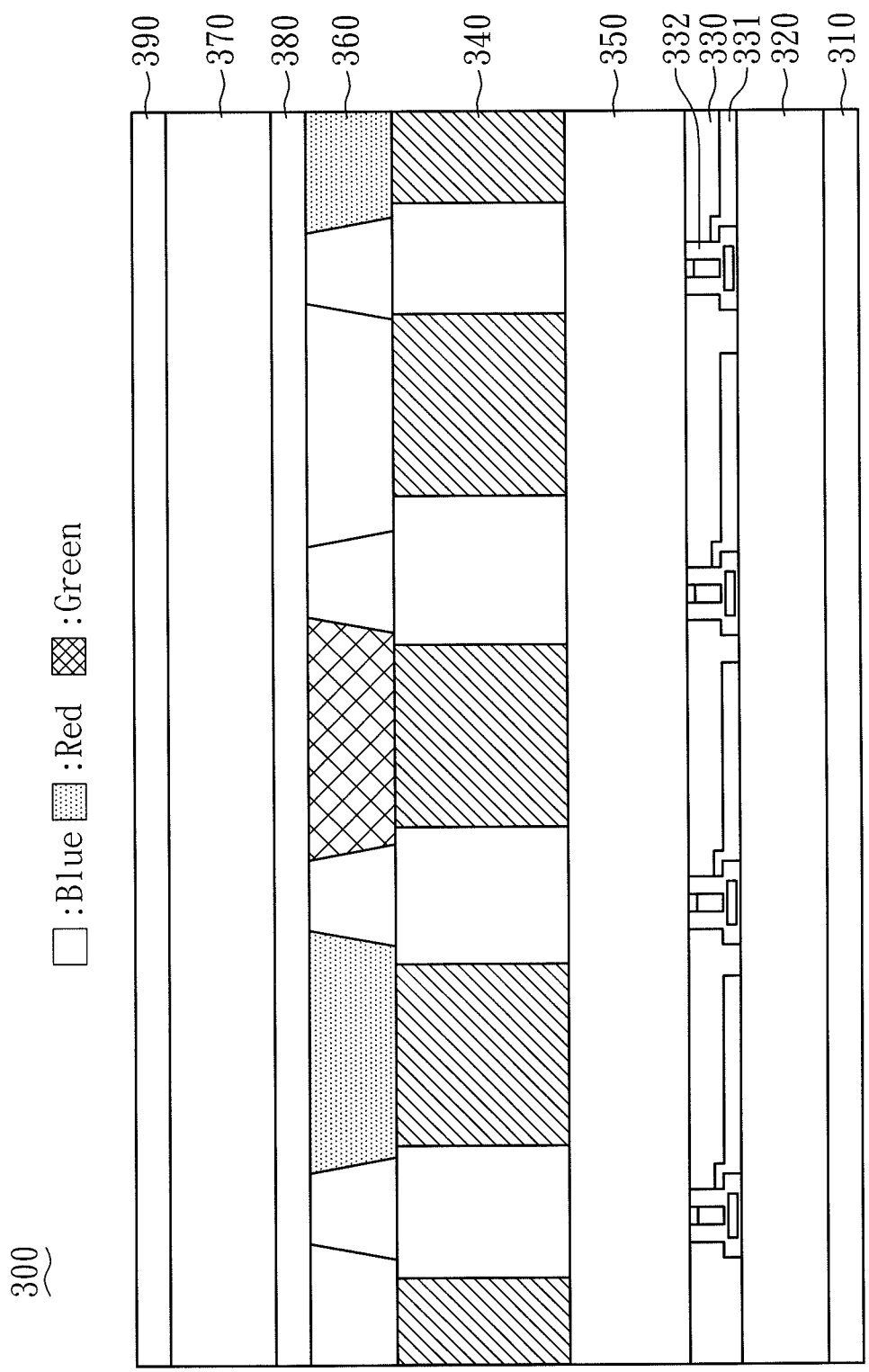
Figure 4A:
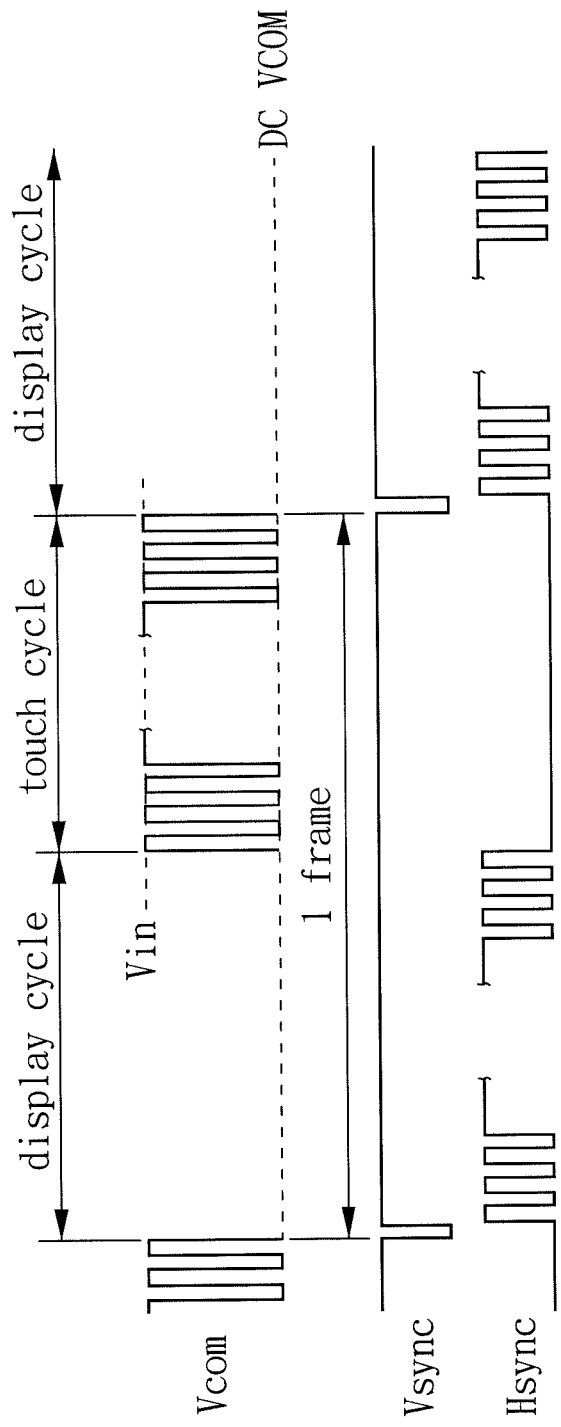
FIGS. 4(A)-4(D) show the timing of a typical in-cell multi-touch panel.
Figure 4B:
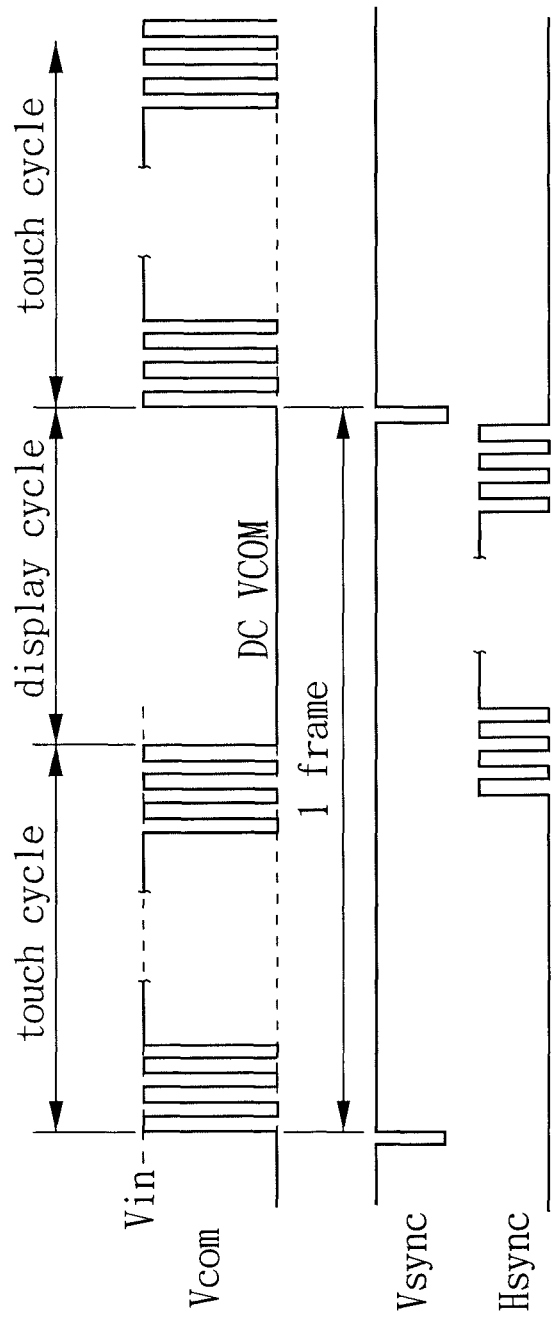
Figure 4C:
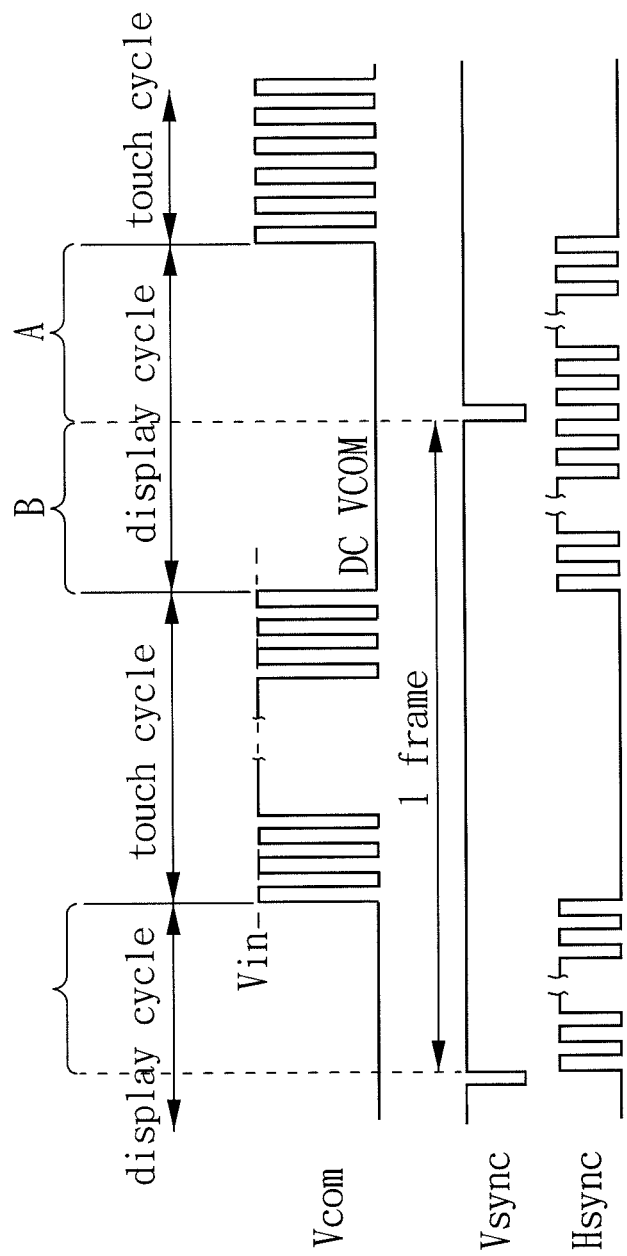
Figure 4D:
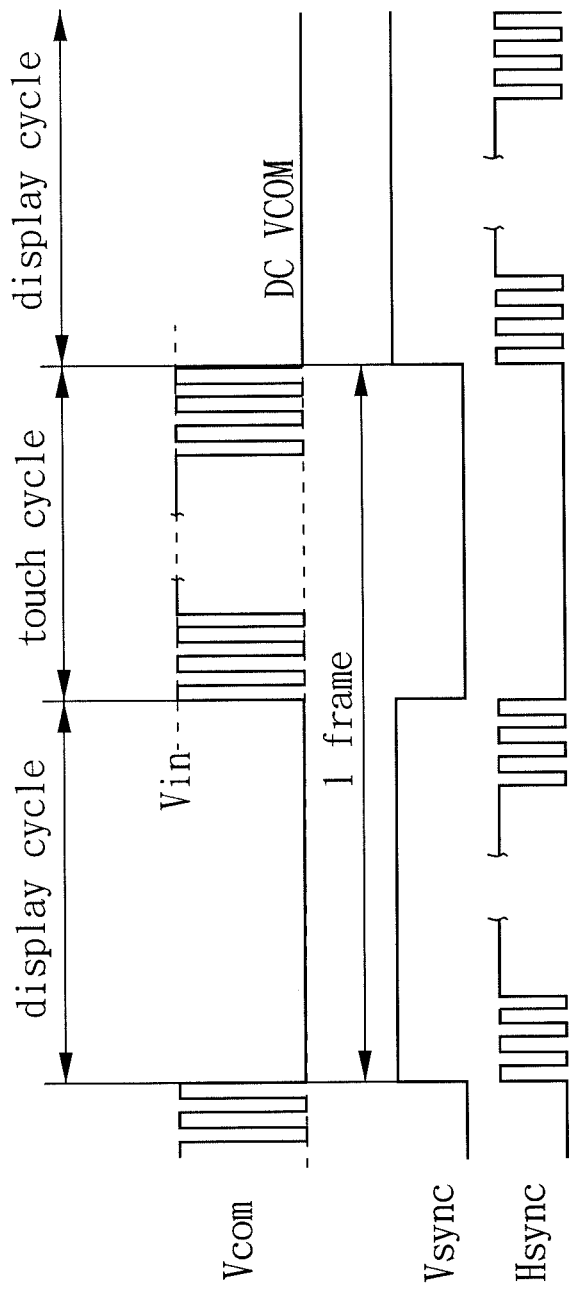
Figure 5:
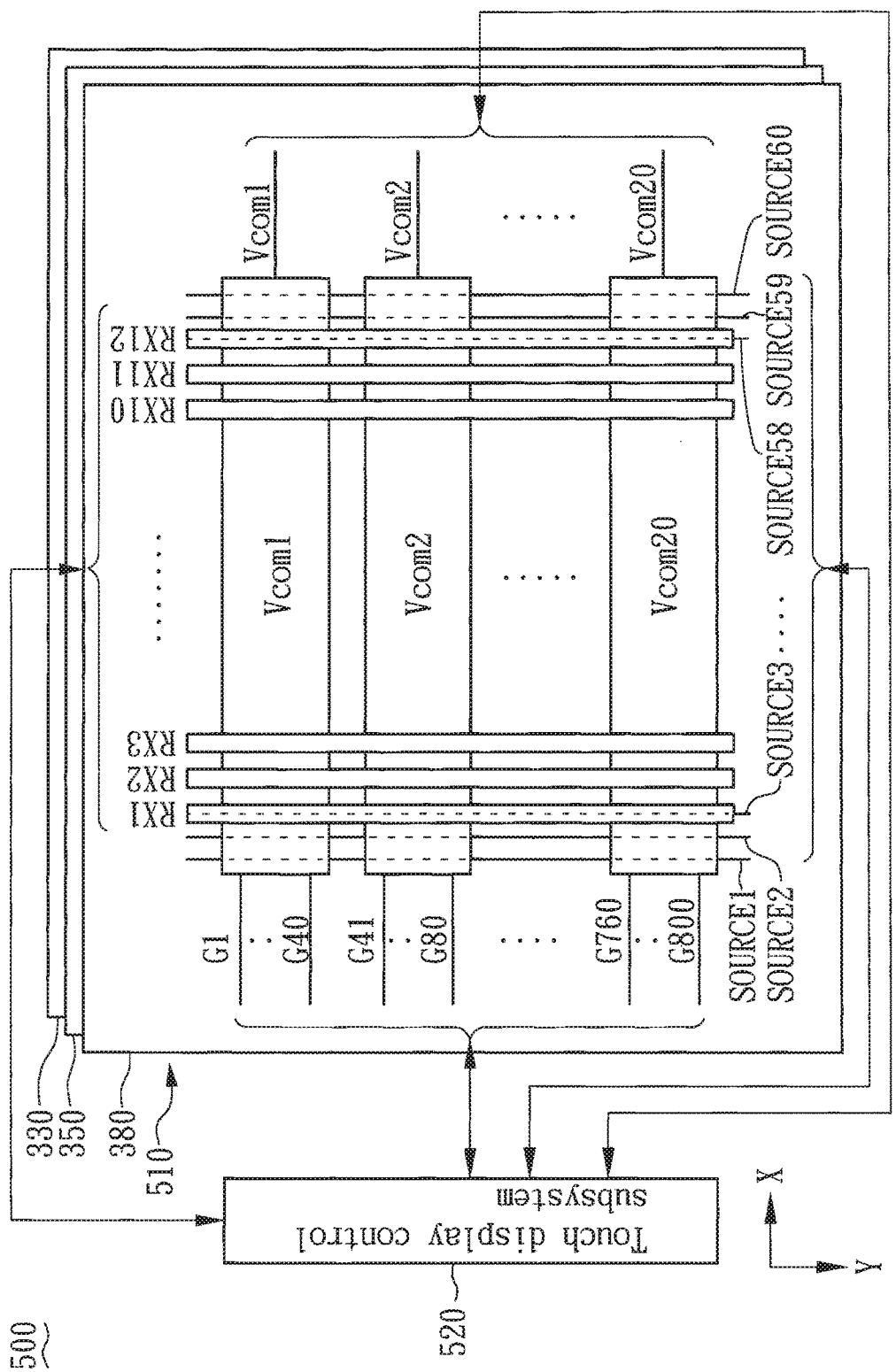
FIG. 5 is a block diagram of an in-cell multi-touch display panel system according to the invention.

FIG. 5 is a block diagram of an in-cell multi-touch display panel system 500 according to the invention. The in-cell multi-touch display panel 500 includes a touch LCD panel 510 and a touch display control subsystem 520.

The touch LCD panel 510 has a thin film transistor (TFT) layer 330, a conductive electrode layer 380, and a common-voltage and touch-driving layer 350, wherein the three layers 330, 350 and 380 can be combined and stacked into one of the configurations shown in FIGS. 3(A)-3(D).

The TFT layer 330 has K gate driving lines (G1, G2, . . . , GK) and L source driving lines (SOURCE1, SOURCE2, . . . , SOURCEL) in order to drive transistors and capacitors corresponding to pixels of the LCD panel 510 based on a display pixel signal and a display driving signal in display, where K, L are each a positive integer. For convenience of description, in this embodiment, we have K=800 and L=600.

The active element of the TFT transistor layer 330 is the TFT in this embodiment. In other embodiments, the active element can be a low temperature polysilicon (LTPS) TFT, indium gallium zinc oxide (IGZO) TFT, or continuous grain silicon (CGS).

The conductive electrode layer 380 has M first conduct lines (RX1, RX2, . . . , RXM) in order to detect an approaching external object based on a touch driving signal, where M is a positive integer. In this embodiment, we have M=12.

The common-voltage and touch-driving layer 350 has N second conduct lines (Vcom1, Vcom2, . . . , VcomN) in order to receive a common voltage signal in display and a touch-driving signal in touch detection, where N is a positive integer, and K>N. In this embodiment, we have N=20.

The M first conduct lines (RX1, RX2, . . . , RXM) and the L source driving lines (SOURCE1, SOURCE2, . . . , SOURCEL) are located in a first direction (Y) while the K gate driving lines (G1, G2, . . . , GK) and the N second conduct lines (Vcom1, Vcom2, . . . , VcomN) are located in a second direction (X) which is vertical to the first direction.

In this embodiment, the K gate driving lines (G1, G2, . . . , GK) are divided into N groups corresponding to the N second conduct lines (Vcom1, Vcom2, . . . , VcomN) in an one-to-one manner. Namely, the gate driving lines G1-G40 correspond to the second conduct line Vcom1, the gate driving lines G41-G80 correspond to the second conduct line Vcom2, and so on. That is, the first group contains the gate driving lines G1-G40, the second group contains the gate driving lines G41-G80, . . . , and the twentieth group contains the gate driving lines G761-G800. Furthermore, the first group of gate driving lines G1-G40 is in the TFT layer 330, and the corresponding second conduct line Vcom1 is at the same location in the common-voltage and touch-driving layer (Vcom) 350. The remainders are alike.

When K is not an integer multiple of N, such as K=802 and N=20, the gate driving lines G1-G41 correspond to the second conduct line Vcom1, the gate driving lines G42-G82 correspond to the second conduct line Vcom2, the gate driving lines G83-G122 correspond to the second conduct line Vcom3, and so on.

The touch display control subsystem 520 is connected to the TFT layer 330, the conductive electrode layer 380, and the common-voltage and touch-driving layer 350 for sequentially providing the display driving signal to the K (800) gate driving lines to turn on corresponding transistors and provide the display pixel signal to the L (600) source driving lines in display. The touch display control subsystem 520 sequentially provides the touch driving signal to the N second conduct lines (Vcom1, Vcom2, . . . , Vcom20) and samples touch voltages from the first conduct lines (RX1, RX2, . . . , RX12) for detecting whether an external object is approached.

The K (800) gate driving lines are divided into N (20) groups, each corresponding to one of the second conduct lines. When one of the groups has the display driving signal, the corresponding second conduct line is connected to the common voltage signal (Vcom) for grounding in display.

The operation principle of the touch display control subsystem 520 is described hereinafter. When the touch display control subsystem 520 provides the touch driving signal to the i-th second conduct line, it first determines whether the display driving signal is concurrently provided, and then provides the touch driving signal to the i-th second conduct line when no display driving signal is provided concurrently. Thus, both display and touch detection can be made concurrently.

Figure 6:
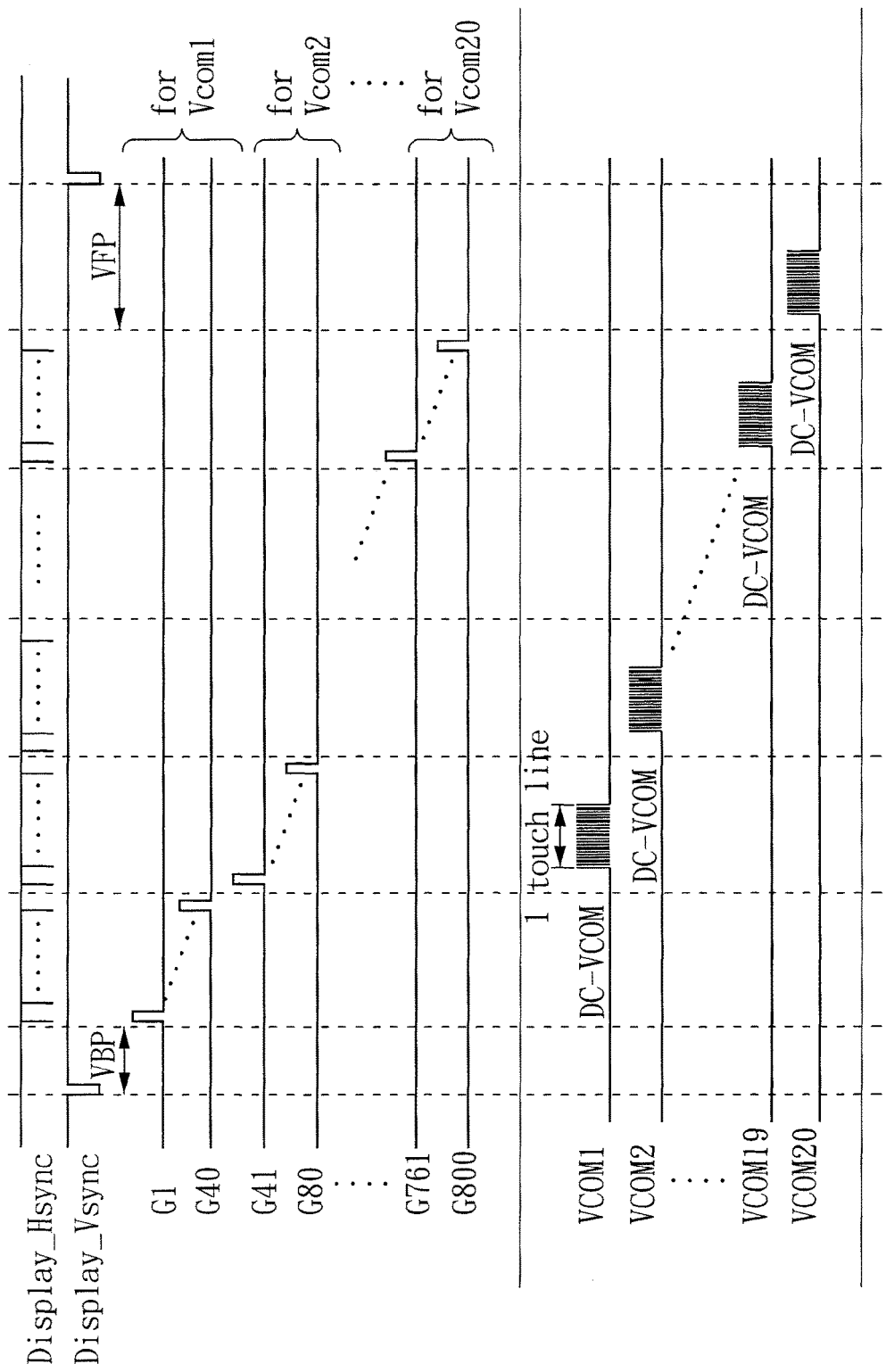
FIG. 6 is a timing of an embodiment of a touch display control subsystem in display and touch detection according to the invention.

FIG. 6 is a timing of an embodiment of the touch display control subsystem 520 in display and touch detection according to the invention. First, when the touch display control subsystem 520 provides the display driving signal to the first group of gate driving lines, it provides a common voltage signal to the N second conduct lines in order to connect the N second conduct lines to the common voltage signal (Vcom).

When the touch display control subsystem 520 provides the display driving signal to the i-th group of gate driving lines, it provides the touch driving signal to the (i–1)-th second conduct line, where i is an integer ranging from 2 to N.

After the touch display control subsystem 520 provides the display driving signal to the N-th group of gate driving lines, it provides the touch driving signal to the N-th second conduct line.

The timing of FIG. 6 shows that a change in partial timing is not necessary completely. Namely, the timing of using the touch display control subsystem 520 to provide the display driving signal to the K gate driving lines (G1, G2, . . . , G800) is as same as that of the original LCD panel. As shown in FIG. 6, when a vertical synchronous signal (Vsync) is inputted, the first group of gate driving lines G1-G40 corresponding to the second conduct line Vcom1 at the same location is sequentially driven, and in this case the second conduct line Vcom1 has no change. The touch display control subsystem 520 provides the common voltage signal (Vcom) to the second conduct line Vcom1 and other N second conduct lines to thereby connect the N second conduct lines to the common voltage signal (Vcom).

When the gate driving line G41 is driven, the touch display control subsystem 520 provides the touch driving signal to the second conduct line Vcom1 and samples touch voltages from the M first conduct lines (RX1, RX2, . . . , RX12) for detecting whether an external object approaches to the second conduct line Vcom1.

When the gate driving line G81 is driven, the touch display control subsystem 520 provides the touch driving signal to the second conduct line Vcom2 and samples touch voltages from the M first conduct lines (RX1, RX2, . . . , RX12) for detecting whether an external object approaches to the second conduct line Vcom2.

As shown in FIG. 6, the display and touch data associated with the second conduct lines Vcom1~Vcom20 is sequentially completed, and there is no need of performing the time sharing or reducing the driving time in display timing due to a touch detection to be performed.

Figure 7:
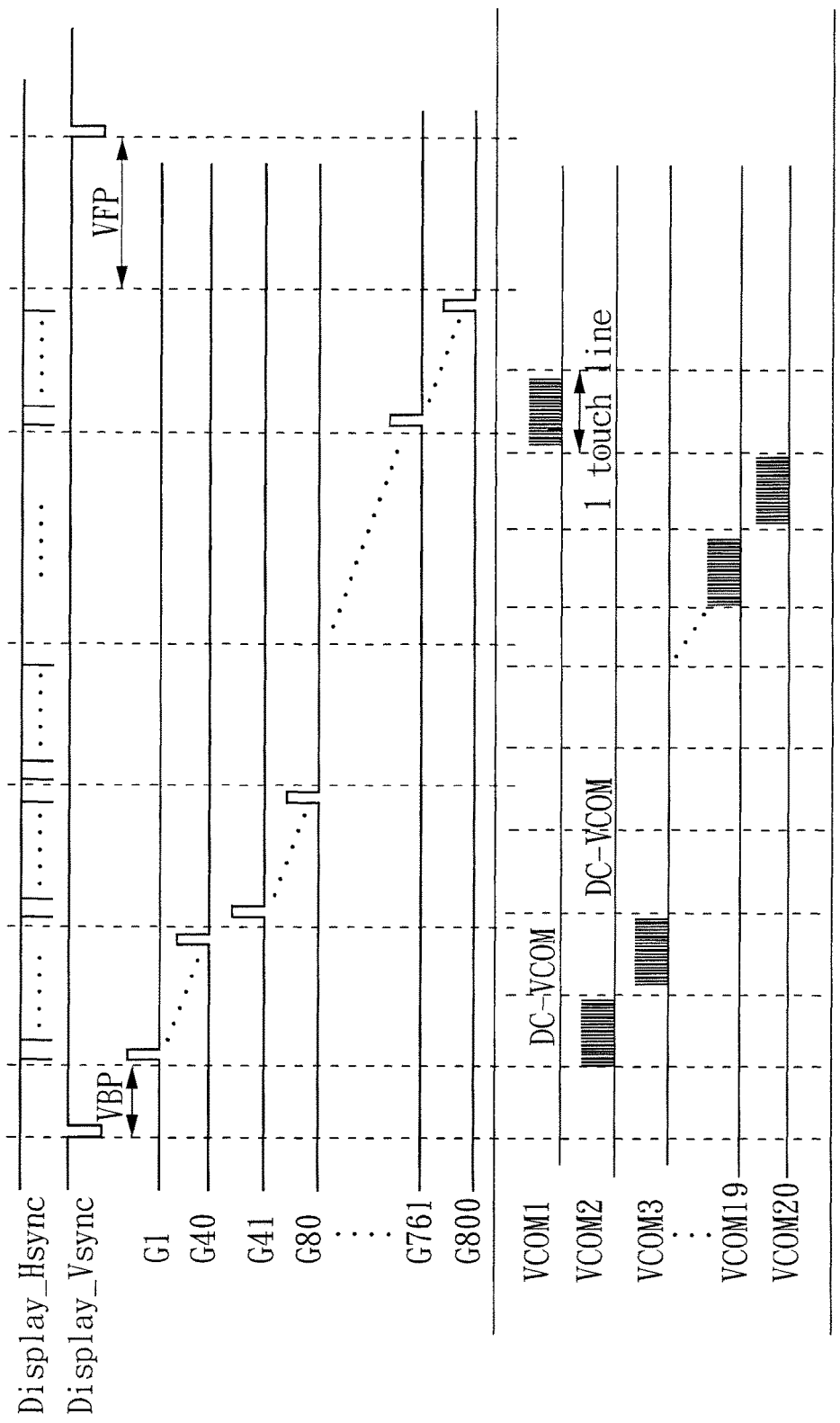
FIG. 7 is a timing of another embodiment of a touch display control subsystem in display and touch detection according to the invention.

FIG. 7 is a timing of another embodiment of the touch display control subsystem 520 in display and touch detection according to the invention. As shown in FIG. 7, the touch display control subsystem 520 concurrently provides the display driving signal to the N groups of gate driving lines (G1, G2, . . . , G800) and the touch driving signal to the N second conduct lines (Vcom1, Vcom2, . . . , VcomN) in a predetermined time. As shown in FIG. 7, the touch display control subsystem 520 provides the display driving signal to the N groups of gate driving lines sequentially in a predetermined time when a VBP time passes after the vertical synchronous signal (Vsync). In addition, the touch display control subsystem 520 provides the touch driving signal to the 2-th to N-th second conduct lines and the first second conduct line sequentially in the predetermined time (after the VBP time).

FIG. 7 shows another similar concept of control timing, which is assumed that the time required for driving one second conduct line Vcom1 is smaller than that for driving one group of gate driving lines G1-G40. Thus, after the vertical synchronous signal Vsync, the subsystem 520 first drives the first group of gate driving lines G1-G40 sequentially, where the first group of gate driving lines G1-G40 are located in a position as same as the second conduct line Vcom1 in the common-voltage and touch-driving layer 350. When the touch display control subsystem 520 sequentially drives the first group of gate driving lines G1-G40, it provides the touch driving signal to the second conduct lines Vcom2-Vcom20 sequentially and finally to the first conduct line Vcom1 to thus complete the touch scanning procedure for one full frame.

Further, the driving method of the invention can be used without any problem if it is ensured that the touch driving signal is provided to the second conduct line Vcom1 after the display driving signal G41 and above are provided by the touch display control subsystem 520.

It is noted that the scanning frequency of the touch lines is not necessarily consistent with that of the display lines, and the scanning frequency of the touch screen is not necessarily consistent with that of the display screen. In addition, the scan time of the touch screen at start is not necessarily synchronous with the display time of the display screen at start, and the driving frequency of the touch driving signal on the second conduct lines is not necessarily consistent with the scanning frequency of the display lines. For example, if the display screen has an updated frequency of 60 Hz, the scanning frequency of the touch screen is not limited to 60 Hz.

Figure 8:
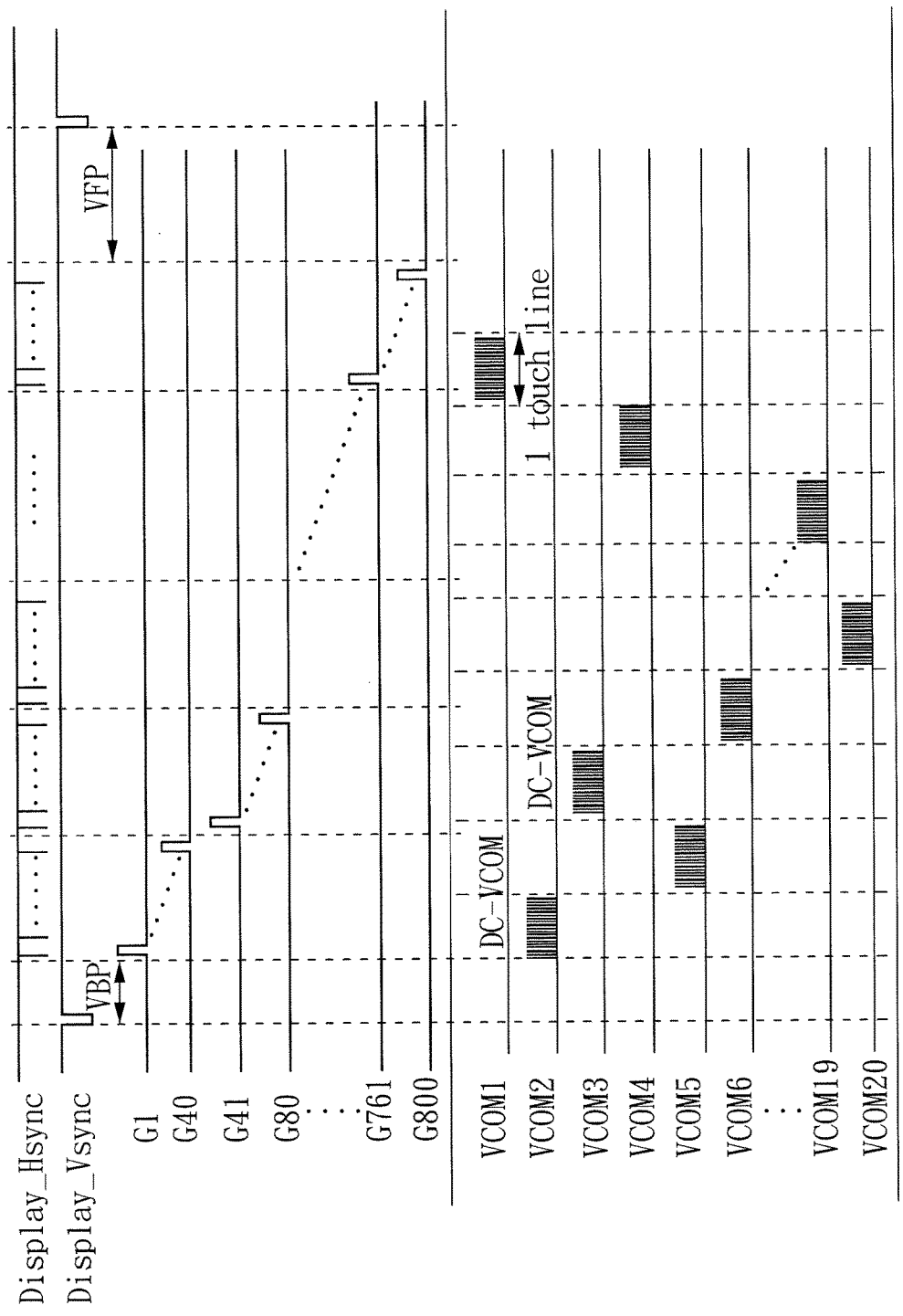
FIG. 8 is a timing of still another embodiment of a touch display control subsystem in display and touch detection according to the invention.

FIG. 8 is a timing of still another embodiment of the touch display control subsystem 520 in display and touch detection according to the invention. When the subsystem 520 non-sequentially provides the touch driving signal to the i-th second conduct line, it first determines whether the display driving signal is also provided to the i-th group of gate driving lines. If yes, the touch display control subsystem 520 provides the touch driving signal to the other second conduct lines except the i-th second conduct line, and otherwise the touch display control subsystem 520 provides the touch driving signal to the i-th second conduct line. As shown in FIG. 8, the touch display control subsystem 520 non-sequentially provides the touch driving signal to the i-th second conduct line.

Figure 9:
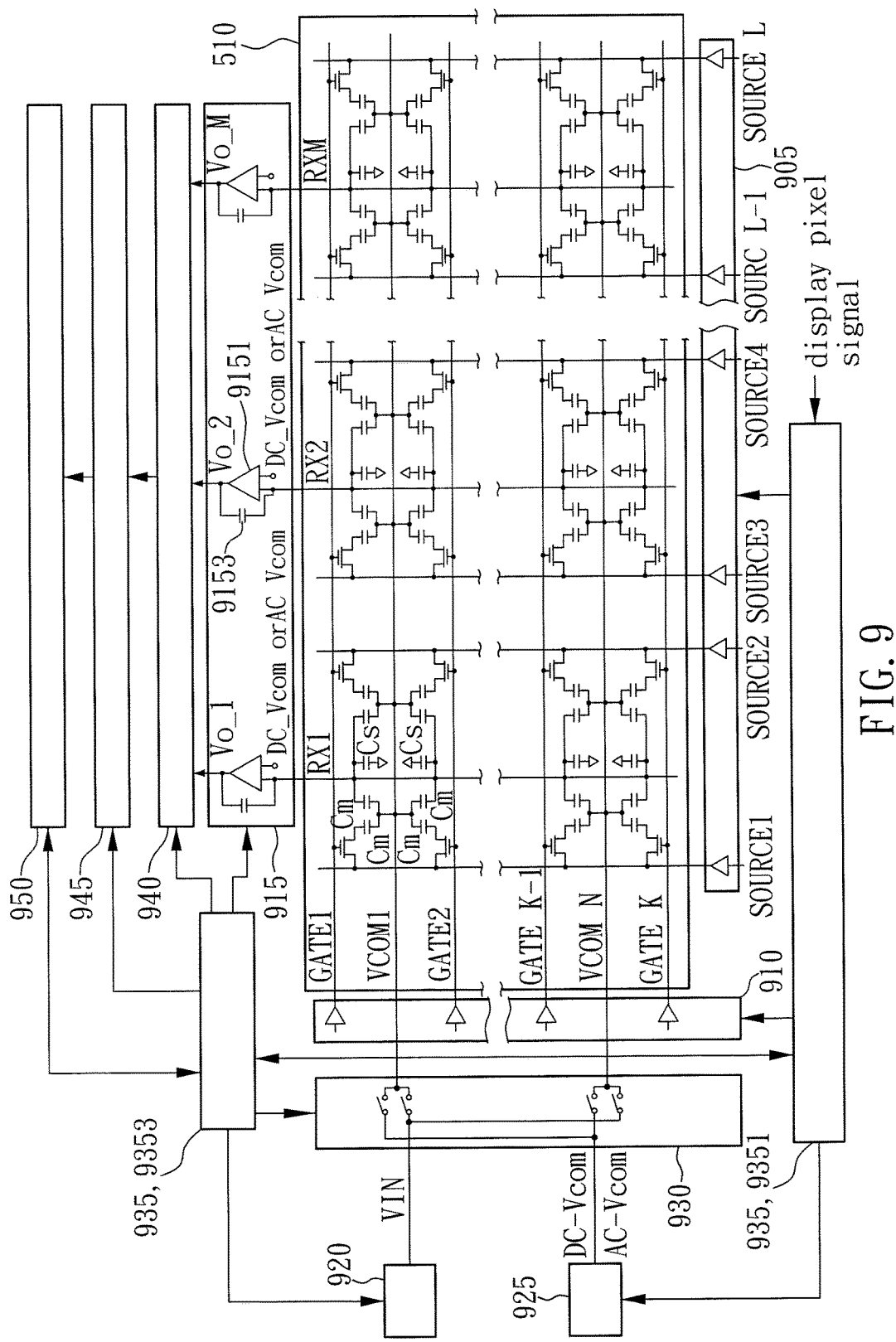
FIG. 9 is a circuit schematic of an in-cell multi-touch display panel system according to an embodiment of the invention.

FIG. 9 is a circuit schematic of the in-cell multi-touch display panel system 500 according to an embodiment of the invention. The touch display control subsystem 520 includes a source driver 905, a gate driver 910, a sensor 915, a touch driving signal generator 920, a common voltage generator 925, a switch 930, a control device 935, a programmable gain amplifier 940, an analog-to-digital converter (ADC) 945, and a coordinate decision device 950.

The source driver 905 is connected to the touch LCD panel 510 for driving the touch LCD panel 510 based on the display pixel signal.

The gate driver 910 is connected to the touch LCD panel 510 for generating the display driving signal to drive the touch LCD panel 510.

The sensor 915 is connected to the touch LCD panel 510 for detecting the signal of the touch LCD panel 510.

The touch driving signal generator 920 generates the touch driving signal VIN in a self or mutual capacitance sensing.

The common-voltage generator 925 generates a common voltage signal (Vcom), which can be a DC common voltage (DC-Vcom) or an AC common voltage (AC-Vcom).

The switch 930 is connected to the touch LCD panel 510, the touch driving signal generator 920, and the common voltage generator 925.

The control device 935 includes a display clock controller 9351 and a touch clock controller 9353. The control device 935 is connected to the source driver 905, the gate driver 910, the common voltage generator 925, the sensor 915, the touch driving signal generator 920, the switch 930, the programmable gain amplifier 940, the analog-to-digital converter 945, and the coordinate decision device 950 for configuring the switch 930 to provide the touch driving signal or the common voltage signal (Vcom) to the N second conduct lines, configuring the gate driver 910 to sequentially output the display driving signal to the K gate driving lines, and configuring the source driver 905 to output the display pixel signal to the L source driving lines.

The display clock controller 9351 is connected to the source driver 905, the gate driver 910, and the common voltage generator 925 in order to provide the timing of the display pixel signal output by the source driver 905, of the display driving signal output by the gate driver 910, and of the common voltage signal (Vcom) generated by the common voltage generator 925.

The touch clock controller 9353 is connected to the display clock controller 9351, the sensor 915, the touch driving signal generator 920, and the switch 930 for configuring the switch 930 to provide the touch driving signal and the common voltage signal (Vcom) to the N second conduct lines.

The programmable gain amplifier 940 is connected to the sensor 915 for amplifying the M detection signals to generate M amplified detection signals.

The analog-to-digital converter 945 is connected to the programmable gain amplifier 940 for converting the M amplified detection signals into M digital detection signals.

The coordinate decision device 950 is connected to the analog-to-digital converter 945 for determining a coordinate of the approached external object based on the M digital detection signals.

The M first conduct lines and the N second conduct lines respectively have parasitic and stray capacitance. There is a mutual capacitance Cm formed respectively in the overlaps between the M first conduct lines and the N second conduct lines. Each of the first conduct lines (RX1, RX2, . . . , RX12) and second conduct lines (Vcom1, Vcom2, . . . , Vcom20) has a grounded capacitance for use as a self capacitance Cs.

There are M sensing circuits in the sensor 915 for detecting the mutual capacitance and further generating the corresponding M detection signals.

Each sensing circuit of the sensor 915 consists of an operational amplifier (OA) 9151 and a feedback capacitor 9153. The feedback capacitor 9153 has one end connected to an inverting input terminal of the OA 9151 and the other end connected to an output terminal of the OA 9151. The inverting input terminal of the OA 9151 is connected to one of the M first conduct lines, and the non-inverting input terminal is connected to the common voltage signal (Vcom).

Figure 10:
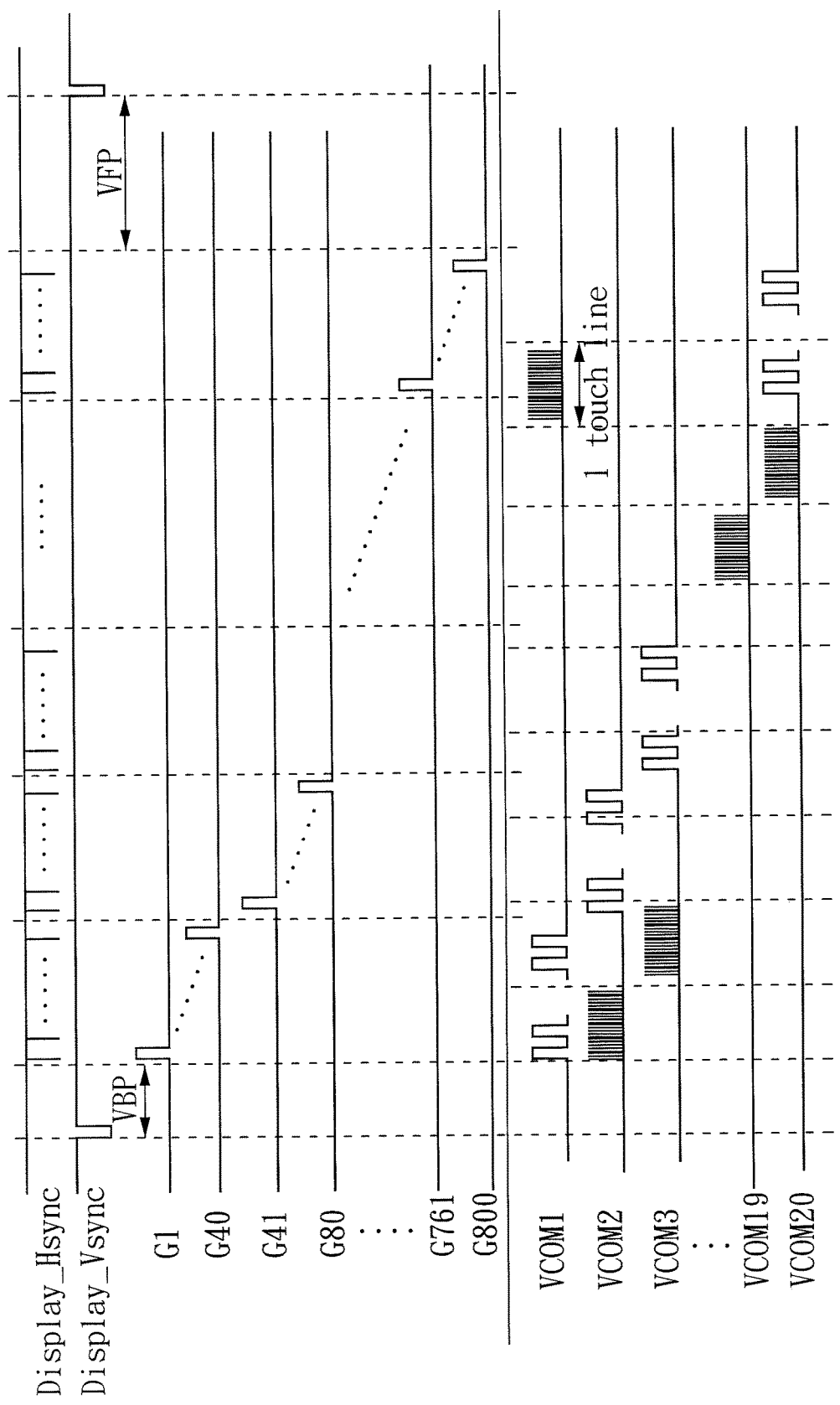
FIG. 10 is a timing of a touch display control subsystem in display and touch detection according to the invention.

FIG. 10 is a timing of the touch display control subsystem 520 in display and touch detection according to the invention. As compared with FIG. 7, the difference is in that the common voltage generator 925 generates the AC common voltage AC-Vcom. Namely, when the touch display control subsystem 520 provides the display driving signal to the first group of gate driving lines G1-G40 sequentially, the common voltage generator 925 generates the AC common voltage (AC-Vcom) to the corresponding second conduct line Vcom1 at the same time. In this case, the AC common voltage (AC-Vcom) rather than the touch driving signal presents on the second conduct line Vcom1, meanwhile, the touch display control subsystem 520 provides the touch driving signal to the second conduct line Vcom2.

In view of the foregoing, it is known that, in addition to integrating the touch sensing circuits into a typical LCD panel, the invention can share the common voltage signal and touch driving layer by the common voltage layer of the LCD panel and the drivers of the touch sensor thereby saving the cost. The prior art uses a time sharing for display and touch detection, rather than sharing the same layer of transparent conductors by the common voltage layer of the LCD panel and the drivers of the touch sensor. Further, the invention uses different timing to drive a display on the LCD panel and perform a touch detection at the same time, which can overcome the problem of insufficient time for driving the display and the touch detection in time sharing.

The first embodiment disclosed in US Patent Publication 2012/0050217 uses a time sharing to apply the touch detection in each line, and the second embodiment uses the time sharing to apply the touch detection in each frame. Thus, the settling time for the display data and the touch data is sacrificed. In addition, the third embodiment thereof uses a toggle of the common voltage layer of the LCD panel as a trigger to perform the touch detection. In this case, the display and the touch detection are operated concurrently, but the common voltage signal is commonly used as the touch signal, so that the touch detection is limited by the display timing resulting in being unable to select a suitable frequency.

Accordingly, it is clear from the above description that the invention has the advantages as follows:

1. The original configuration can be used, with sharing the same layer of transparent conductors by the common voltage layer of the LCD panel and the drivers of the touch sensor, thereby saving the cost.

2. When the LCD panel is driven, in addition to the second conduct lines corresponding to the gate driving lines (G1, G2, . . . , GK) in display, at least one of the other second conduct lines can be driven in touch detection at the same time. Namely, the display on the LCD panel and the touch detection in the invention can be performed concurrently with the respective signals (DC-Vcom, AC-Vcom, VIN) outputted to the different second conduct lines (Vcom1, Vcom2, . . . , VcomN), so that there is no lost time for the panel display and the touch detection.

3. The timing of the gate driving lines (G1, G2, . . . , GK) and source driving lines (SOURCE1, SOURCE2, . . . , SOURCEL) on the LCD panel can maintain in touch detection without a change, and the second conductors (Vcom1, Vcom2, . . . , VcomN) on the updating area or areas of the LCD panel can be avoided by using the touch clock controller to read the signals (such as Vsync/Hsync) associated with the LCD panel in operation.

4. It allows the touch signal to automatically avoid the second conduct lines (Vcom1, Vcom2, . . . , VcomN) corresponding to the gate driving lines (G1, G2, . . . , GK) in display, thereby preventing the common voltage signal (Vcom) and the touch driving signal from being concurrently provided to the same second conduct line (Vcom1, Vcom2, . . . , VcomN). Therefore, the display timing of the LCD panel is not changed necessarily. Namely, the touch detection is not necessarily synchronous with the display on the LCD panel, so as to easily implement an asynchronous configuration with a frequency of 60 Hz for the display on the LCD panel and a frequency of 100 Hz for the touch detection, for example.

Although the present invention has been explained in relation to its preferred embodiment, it is to be understood that many other possible modifications and variations can be made without departing from the spirit and scope of the invention as hereinafter claimed.

What is claimed is:

1. An in-cell multi-touch display panel system, comprising:
   a touch liquid crystal display (LCD) panel, including:
     a thin film transistor (TFT) layer, having K gate driving lines in a second direction, L source driving lines in a first direction, and a plurality of thin film transistors, each being arranged at an intersection of one gate driving line and one source driving line and connected to the intersected gate driving line and source driving line where K and L are each a positive integer;

a conductive electrode layer, having M first conduct lines in the first direction for detecting an external object based on a touch driving signal, where M is a positive integer; and a common-voltage and touch-driving layer, having N second conduct lines in the second direction, for receiving a common voltage signal in the display operation and receiving a touch-driving signal in touch detection, where N is a positive integer and K>N, wherein the conductive electrode layer and the common-voltage and touch-driving layer are on the same side of the TFT layer, and the N second conduct lines are intersected with the M first conduct lines; and a touch display control subsystem, connected to the TFT layer, the conductive electrode layer, and the common-voltage and touch-driving layer, for providing display driving signal sequentially to the K gate driving lines and turn on the corresponding thin film transistors, providing display pixel signal to the L source driving lines thereby performing a display operation, and providing the touch driving signal to the N second conduct lines and sampling touch voltages from the M first conduct lines to detect if there is the external object or not;

wherein the K gate driving lines are divided into N groups corresponding to the N second conduct lines, respectively, and when one group of gate driving lines has the display driving signal, the second conduct line corresponding to the group of gate driving lines is connected to the common voltage, and wherein the touch display control subsystem does not provide the touch driving signal to the i-th second conduct line when the display driving signal is provided to one group of gate driving lines corresponding to the i-th second conduct line, wherein i is a positive integer and 2≤i≤N, and provides the touch driving signal to the i-th second conduct line in a display period when the display driving signal is not provided to one group of gate driving lines corresponding to the i-th second conduct line;

wherein the touch display control subsystem provides the touch driving signal to the (i−1)-th second conduct line and the display driving signal to the i-th group of gate driving lines corresponding to the i-th second conduct line at the same time.

2. The in-cell multi-touch display panel system as claimed in claim 1, wherein the first direction is perpendicular to the second direction.

3. The in-cell multi-touch display panel system as claimed in claim 1, wherein when a vertical synchronous signal is inputted by the touch display control subsystem, the group of gate driving lines corresponding to the second conduct line at the same location is sequentially driven.

4. The in-cell multi-touch display panel system as claimed in claim 1, wherein when the display driving signal is provided to the first group of gate driving lines, the touch display control subsystem provides the common voltage signal to the N second conduct lines for connecting the N second conduct lines to the common voltage signal.

5. The in-cell multi-touch display panel system as claimed in claim 4, wherein the touch display control subsystem provides the touch driving signal to the N-th second conduct lines after the display driving signal is provided to the N-th group of gate driving lines.

6. The in-cell multi-touch display panel system as claimed in claim 1, wherein the touch display control subsystem is based on a predetermined time to provide the display driving signal to the N groups of gate driving lines and provide the touch driving signal to the N second conduct lines simultaneously.

7. The in-cell multi-touch display panel system as claimed in claim 6, wherein the touch display control subsystem non-sequentially provides the touch driving signal to an i-th second conduct line.

8. The in-cell multi-touch display panel system as claimed in claim 6, wherein the touch display control subsystem provides the display driving signal sequentially to the first to N-th groups of gate driving lines in the predetermined time.

9. The in-cell multi-touch display panel system as claimed in claim 8, wherein the touch display control subsystem provides the touch driving signal sequentially to the 2-th to N-th second conduct lines and the first second conduct line in the predetermined time.

10. The in-cell multi-touch display panel system as claimed in claim 6, wherein the touch display control subsystem comprises:
   a source driver, connected to the touch LCD panel, for driving the touch LCD panel based on the display pixel signal;
   a gate driver, connected to the touch LCD panel, for generating the display driving signal to drive the touch LCD panel;
   a sensor, connected to the touch LCD panel, for detecting a signal of the touch LCD panel;
   a touch driving signal generator, for generating the touch driving signal;
   a common-voltage generator, for generating the common voltage signal;
   a switch connected to the touch LCD panel, the touch driving signal generator, and the common voltage generator; and
   a control device, connected to the source driver, the gate driver, the common voltage generator, the sensor, the touch driving signal generator, and the switch, for configuring the switch to provide the touch driving signal or the common voltage signal to the N second conduct lines, configuring the gate driver to sequentially output the display driving signal to the K gate driving lines, and configuring the source driver to output the display pixel signal to the L source driving lines.

11. The in-cell multi-touch display panel system as claimed in claim 10, wherein the control device comprises:
   a display clock controller, connected to the source driver, the gate driver, and the common voltage generator, for providing a timing of the display pixel signal outputted by the source driver, a timing of the display driving signal outputted by the gate driver, and a timing of the common voltage signal generated by the common voltage generator; and
   a touch clock controller, connected to the display clock controller, the sensor, the touch driving signal generator, and the switch, for configuring the switch to provide the touch driving signal and the common voltage signal to the N second conduct lines.

12. The in-cell multi-touch display panel system as claimed in claim 11, wherein the M first conduct lines and the N second conduct lines respectively have parasitic and stray capacitance, and there is a mutual capacitance formed respectively in overlaps between the M first conduct lines and the N second conduct lines.

13. The in-cell multi-touch display panel system as claimed in claim 12, wherein the sensor comprises M sensing circuits for detecting the mutual capacitance and further generating corresponding M detection signals.

14. The in-cell multi-touch display panel system as claimed in claim 13, wherein the touch display control subsystem further comprises:
a programmable gain amplifier, connected to the sensor, for amplifying the M detection signals to generate M amplified detection signals;
an analog-to-digital converter (ADC), connected to the programmable gain amplifier, for converting the M amplified detection signals into M digital detection signals; and
a coordinate decision device, connected to the ADC, for determining a coordinate of the approached external object based on the M digital detection signals.

15. The in-cell multi-touch display panel system as claimed in claim 13, wherein each of the M sensing circuits consists of an operational amplifier (OA) and a feedback capacitor, the feedback capacitor has one end connected to an inverting input terminal of the OA and the other end connected to an output terminal of the OA, the inverting input terminal of the OA is connected to one of the M first conduct lines, and the non-inverting input terminal of the OA is connected to the common voltage signal.

16. An in-cell multi-touch display panel system, comprising:
a touch liquid crystal display (LCD) panel, including:
a thin film transistor (TFT) layer, having K gate driving lines in a second direction and L source driving lines in a first direction, and a plurality of thin film transistors, each being arranged at an intersection of one gate driving line and one source driving line and connected to the intersected gate driving line and source driving line, where K and L are each a positive integer;
a conductive electrode layer, having M first conduct lines in the first direction for detecting an external object based on a touch driving signal, where M is a positive integer; and
a common-voltage and touch-driving layer, having N second conduct lines in the second direction, for receiving a common voltage signal in the display operation and receiving a touch-driving signal in touch detection, where N is a positive integer and K>N, wherein the conductive electrode layer and common-voltage and the touch-driving layer are on the same side of the TFT layer, and the N second conduct lines are intersected with the M first conduct lines; and
a touch display control subsystem, connected to the TFT layer, the conductive electrode layer, and the common-voltage and touch-driving layer, for providing display driving signal sequentially to the K gate driving lines and turn on the corresponding thin film transistors, providing display pixel signal to the L source driving lines thereby performing a display operation, and providing the touch driving signal to the N second conduct lines and sampling touch voltages from the M first conduct lines to detect if there is the external object or not, wherein touch display control subsystem comprises:
a touch driving signal generator, for generating the touch driving signal;
a common-voltage generator, for generating the common voltage signal;
a switch connected to the touch LCD panel, the touch driving signal generator, and the common voltage generator; and
a control device, connected to the touch driving signal generator, the common voltage generator, and the switch, for configuring the switch to provide the touch driving signal or the common voltage signal to the N second conduct lines;
wherein the K gate driving lines are divided into N groups corresponding to the N second conduct lines, respectively, and when one group of gate driving lines has the display driving signal, the second conduct line corresponding to the group of gate driving lines is connected to the common voltage, and wherein the touch display control subsystem does not provide the touch driving signal to the i-th second conduct line when the display driving signal is provided to one group of gate driving lines corresponding to the i-th second conduct line, wherein i is a positive integer and $2 \leq i \leq N$, and provides the touch driving signal to the i-th second conduct line in a display period when the display driving signal is not provided to one group of gate driving lines corresponding to the i-th second conduct line;
wherein the touch display control subsystem provides the touch driving signal to the (i−1)-th second conduct line and the display driving signal to the i-th group of gate driving lines corresponding to the i-th second conduct line at the same time.

* * * * *